T 860,002

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 677

762,159

PROCESS FOR DRY SPINNING POLY(4-METHYL/-1-PENTENE)

Gerald A. McFarren, Wilmington, Del., assignor to Hercules Incorporated, Wilmington, Del., a corporation of Delaware

Continuation-in-part of abandoned application Ser. No. 375,962, June 17, 1964. This application Sept. 24, 1968. Published Mar. 18, 1969.

Class 264—210

No Drawing. 11 Pages Specification

Fibers of high molecular weight poly(4-methyl-1-pentene) have long been desired because of the high melting point of the polymer (above 230° C.). However, both melt and solution spinning have resulted in severe polymer degradation and the fiber so produced had poor physical properties.

The process of this application enables the production of a fiber of poly(4-methyl-1-pentene) having a reduced specific viscosity (RSV) greater than 5 as measured on a 0.1% solution in decahydronaphthalene at 135° C. The following steps are carried out:

(1) formation of a gel containing 20–60% by weight of a poly(4-methyl-1-pentene), having an RSV greater than 5, from the dry polymer, or the solvent-wet filter cake from the polymerizer, by heating with a suitable diluent (hydrocarbon or chlorinated hydrocarbon having a boiling point of 175 to 300°C.) to 150–225° C. until dissolved and then cooling, (2) charging said gel to an extruder heated to 160–285° C., (3) extruding a filament, (4) passing the filament through solvent removal means, and (5) orienting the filament by stretching from 250 to 1300%.

The oriented fiber exhibits excellent physical properties including high temperature strength retention and good abrasion resistance.